United States Patent
Kang et al.

[19]

[11] Patent Number: 6,016,148
[45] Date of Patent: Jan. 18, 2000

[54] AUTOMATED MAPPING OF FACIAL IMAGES TO ANIMATION WIREFRAMES TOPOLOGIES

[75] Inventors: Sing Bing Kang, Cambridge; Keith Waters, West Newton, both of Mass.

[73] Assignee: Digital Equipment Corporation, Houston, Tex.

[21] Appl. No.: 08/870,480

[22] Filed: Jun. 6, 1997

[51] Int. Cl.[7] .......................... G06T 15/70; G06T 17/20; G06T 11/60
[52] U.S. Cl. .......................... 345/425; 345/435; 382/115; 382/118; 382/308
[58] Field of Search .................... 345/420, 425, 345/435; 382/118, 115, 305, 308

[56] References Cited

U.S. PATENT DOCUMENTS

| | | | |
|---|---|---|---|
| 5,257,346 | 10/1993 | Hanson | 345/425 |
| 5,611,037 | 3/1997 | Hayashi | 395/142 |
| 5,659,625 | 8/1997 | Marquardt | 382/118 |
| 5,774,591 | 6/1998 | Black et al. | 382/236 |
| 5,805,745 | 9/1998 | Graf | 382/118 |

OTHER PUBLICATIONS

Cootes, T.F., and Taylor, C.J. "Locating Faces Using Statistical Feature Detectors," Paper presented at the Proc. 2nd International Conference on Automatic Face and Gesture Recognition, Killington, Vermont (Oct., 1996).

DeCarlo, D., and Metaxas, D., "The Integration of Optical Flow and Deformable Models with Applications to Human Face Shape and Motion Estimation," Paper presented at the CVPR, San Francisco, California (Jun., 1996).

Essa, I.A., and Pentland, A., "A Vision System for Observing and Extracting Facial Action Parameters," Paper presented at the Procs. CVPR, Seattle, Washington, (Jun. 1994).

Lee, Y., et al., "Realistic Modeling for Facial Animation," Computer Graphics Proceedings, Annual Conference Series, pp. 55–62 (1995).

Reinders, M.J.T., et al., "Facial Feature Localization and Adaptation of a Generic Face Model for Model–Based Coding," *Signal Processing: Image Communication*, 7:57–74 (1995).

Waters, K., "A Muscule Model for Animating Three–Dimensional Facial Expression," *Computer Graphics*, 21(4) :17–24 (Jul. 1987).

*Primary Examiner*—Mark R. Powell
*Assistant Examiner*—Chante' Harrison
*Attorney, Agent, or Firm*—Hamilton, Brook, Smith & Reynolds, PC

[57] ABSTRACT

A method for mapping a digitized image of a face to a wireframe is provided. The wireframe is composed of a plurality of nodes connected by lines. The method includes the steps of detecting a plurality of facial features from the plurality of pixels of a reference facial image. Corresponding facial landmark nodes in the wireframe topology are determined. A transform between the facial features and the landmark nodes is computed to map the wireframe topology to reference facial image. The reference facial image and a target facial image are cropped using a bounding box. The cropped reference facial image is registered with the cropped target facial image to determine a displacement field. The displacement field is applied to the mapped wireframe topology for the reference facial image to map the target facial image to the wireframe topology.

6 Claims, 11 Drawing Sheets

AUTOMATED MAPPING OF FACIAL IMAGES TO ANIMATION WIREFRAMES TOPOLOGIES

FIELD OF THE INVENTION

The invention relates generally to the field of computer animation, and more particularly to the field of face modeling wherein a real or synthetic face is mapped onto an wireframe topology.

BACKGROUND OF THE INVENTION

As is known in the art of computer animation and modeling, the DECface software product from Digital Equipment Corporation is a talking synthetic face application. The synthetic face application is a visual complement with a speech synthesizer application referred to as DECtalk, also from Digital Equipment Corporation. By combining the audio functionality of a speech synthesizer with the graphical functionality of a computer-generated face, a variety of engaging user interfaces can be developed. Examples include Internet-based agents capable of seeking and retrieving Web documents to read, Avatars for Chat applications, and front-end interfaces for kiosks.

The DECface application is a software implemented system that facilitates the development of applications requiring a real-time lip-synchronized synthetic face. The original version of DECface operates under Digital Unix and utilizes the X-Window system for display. The current version of the DECface application functions under W32 NT or Windows 95 operating systems, and can be embedded into Web browsers as a plug-in.

One of the components of the DECface application is face modeling. In face modeling, a synthetic or real image of a face can be mapped onto a wireframe topology that has been shaped to the contours and features of a face. The wireframe topology includes a plurality of nodes connected by arcs or lines. The face can be of a person, an animal, or a cartoon character. In the prior art, the process of face modeling has generally been manual, labor intensive and time consuming because every node of the wireframe had to be manually mapped to corresponding facial features.

In a completely manual process, an image of the face is displayed, and the wireframe topology is roughly positioned relative to the image. The user then steps though each individual node of the wireframe and repositions the two-dimensional location of a currently node to match a corresponding feature of the face.

Some automated techniques for mapping, wireframes to images of faces are known. One such method relies on automatically detecting the eyes, the tip of the nose, and the mouth using eigenfeatures as templates. The wireframe topology is then is initialized by an affine warping, based on the location of the detected facial features. However, this form of global transformation is generally an approximation because ratios of facial features in different faces do not chance linearly.

Another method for mapping facial features to a wireframe uses manual identification of facial features such as the center of the eyebrows and the corners of the mouth. In addition, this method requires the storing of explicit connectivity information during the computation of the relative location of the nodes with respect to the imaged features of the face.

A semiautomatic method for mapping is described in U.S. patent application Ser. No. 08/815,981 "Facial Image Method and Apparatus for Semi-Automatically Mapping a Face onto a Wireframe Topology," filed by Kang et al. on Mar. 10, 1997, incorporated in its entirety herein by reference. There, the location of the eyes and mouth are automatically detected. The contour of the face is located using edge detection. These facial features are then mapped to nodes of the wireframe, and the displacements of the nodes are fine-tuned in a manual process.

It is desired to accurately map an arbitrary frontal image of a face onto a wireframe in a fully automated process. By making the process fully automatic, the time required to map an image can be reduced.

SUMMARY OF THE INVENTION

In accordance with the present invention, provided is a computerized method for mapping a digitized image of a face to a wireframe topology stored in a memory of a computer system. The image is composed of a plurality of pixels arranged in a regular pattern. The wireframe is composed of a plurality of nodes connected by lines.

A plurality of salient facial features are detected from the plurality of pixels of a reference facial image. Corresponding landmark nodes are located in the wireframe topology. A transform of the difference between the locations of the detected facial features and the landmark nodes generates a reference wireframe topology for the reference facial image. The reference image and a target image are cropped by a bounding box around the salient facial features to remove extraneous facial features. The cropped images are registered with each other to determine a displacement field. The displacement field is then applied to the reference wireframe topology to map the target facial image to the wireframe topology in an automated manner.

In one aspect of the invention, an image of the target facial image is registered with the reference facial image using spline-based image registration to determine the displacement field.

DETAILED DESCRIPTION OF THE PREFERRED EMBODIMENT

Figure 1:
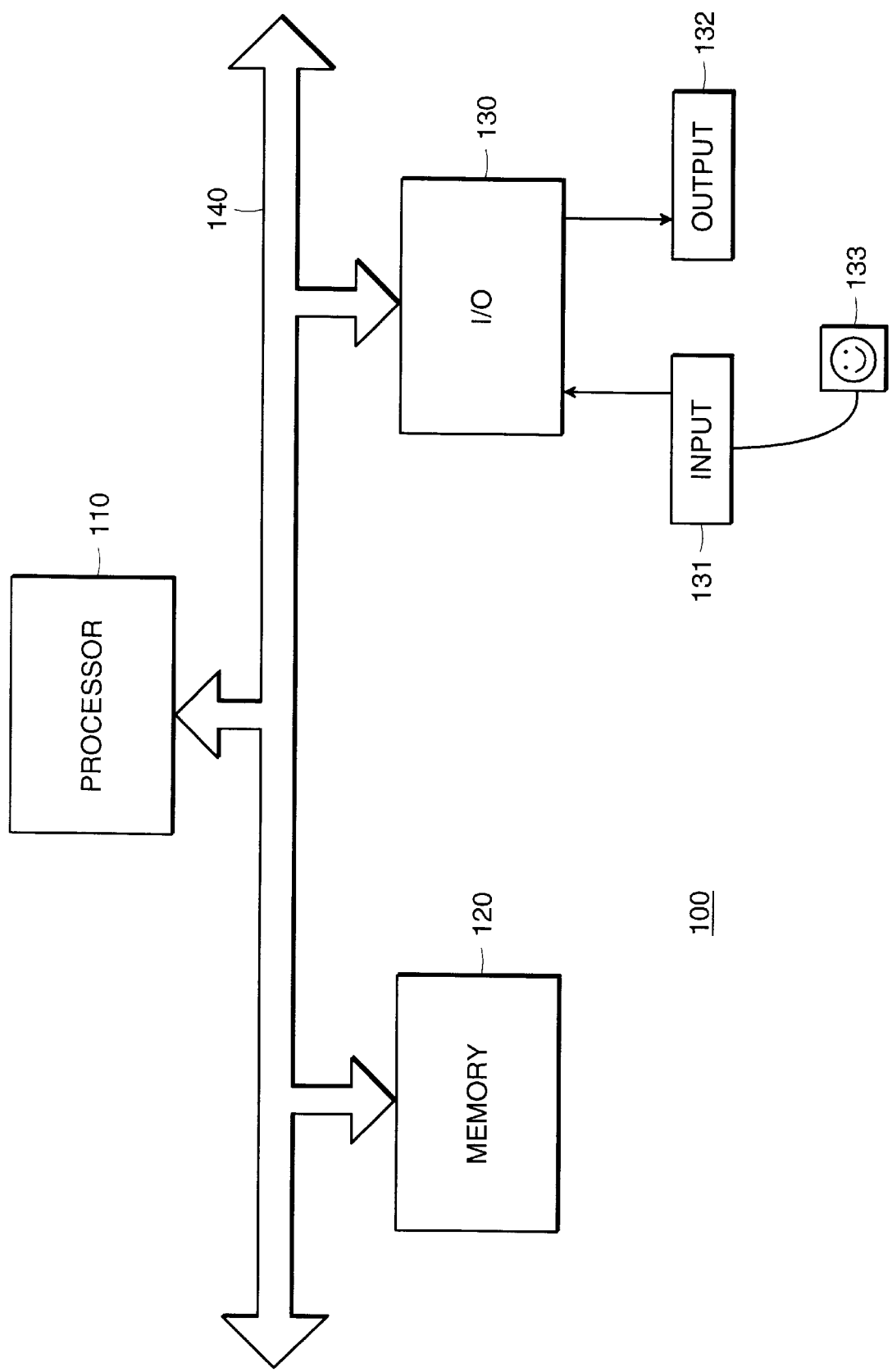
FIG. 1 is a block diagram of a computer system employing the present invention.

FIG. 1 shows an image processing system 100 employing the principles of the invention. The system 100 includes a processor 110, a memory 120, and input/output interfaces (I/O) 130 connected by a bus 140. An input device 131 can be any device which can provide a digital image to the computer system 100, such as a camera or scanning device. In FIG. 1, the system 100 is shown connected to a display device 132.

During operation, the system 100 can digitize images of faces 133. The images are received by the I/O 130 and stored in the memory 120. The memory 120 also stores a facial wireframe topology.

Figure 2:
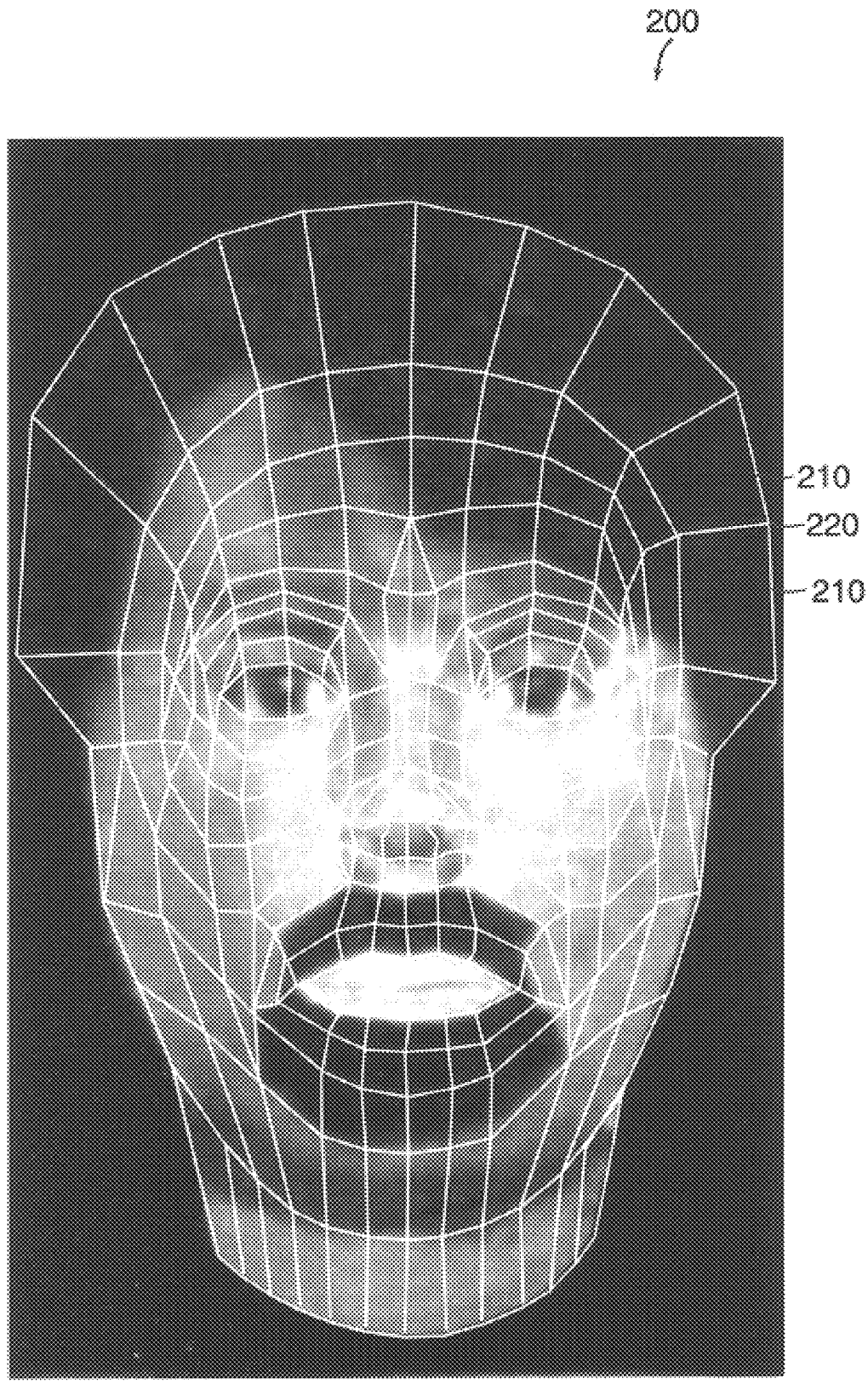
FIG. 2 is a diagram of a wireframe topology.

FIG. 2 shows an example wireframe topology 200 onto which the images 133 can be mapped. In the wireframe topology 200, the intersection of lines 210 are called nodes 210. In the general area corresponding to the eyes, mouth, chin, and margins of the face, the nodes 200 are closely spaced to provide a higher level of definition.

To reduce the complexity of the computations, the wireframe topology 200 is reduced to a simple two dimensional (2D) geometry corresponding to a full frontal view of the face. A frontal view is sufficient because, for the most part, interactions tend to occur face-to-face, so depth of specific facial features are less significant.

In the wireframe 200 of FIG. 2, the polygons outline salient facial features. The nodes corresponding to the jaw can be moved vertically as a function of the displacement of the corners of the mouth. The nodes corresponding to the lower teeth are displaced along with the nodes corresponding to the jaw. The upper eyelids are represented by a double set of nodes so that when the nodes move, the upper eyelids close. The wireframe topology 200 can be automatically be mapped so that it is consistent with any facial image.

Figure 3A:
FIG. 3A is an image of a reference face.
Figure 3B:
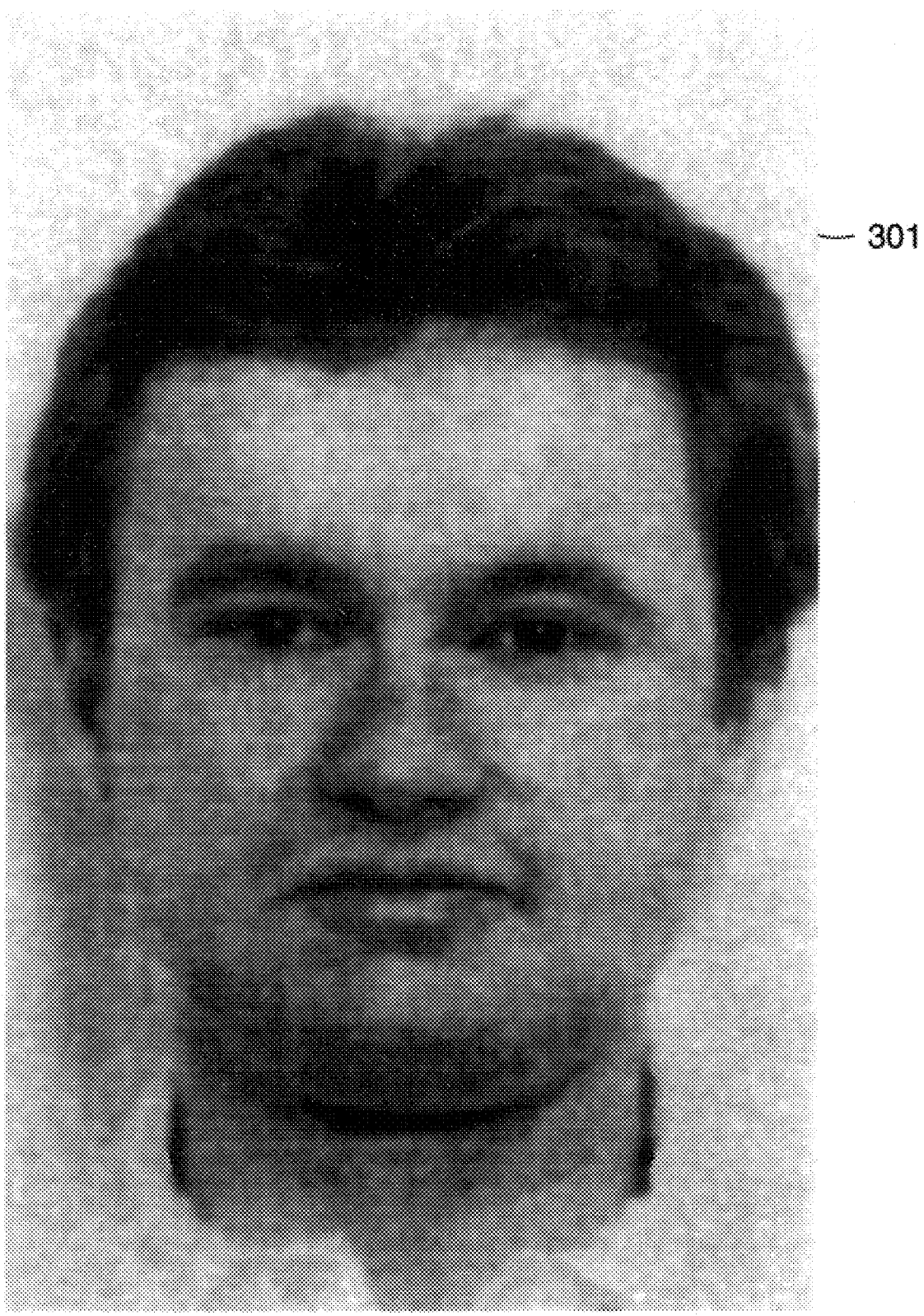
FIGS. 3B–3E are images of faces used to generate the reference face of FIG. 3A.
Figure 3C:
Figure 3D:
Figure 3E:

As shown in FIGS. 3A–3E, the mapping begins with the generation of a reference image of a face, also referred to as a composite reference facial image. By way of example, the reference image 300 of FIG. 3A is a composite image of facial images 301–304 of FIGS. 3B–3E. The reference image 300 may be generated by using any number of real or synthetic facial images. By using the composite image 300, common features can be averaged so that matching with a particular target facial image is facilitated.

In the preferred embodiment, the composite image 300 is generated by picking corresponding features in the images 301–304, and morphing these features using a software package as described in "Using the Snappy Video Snapshot," by R. Blackwell, Play, Inc., 1992.

Figure 4:
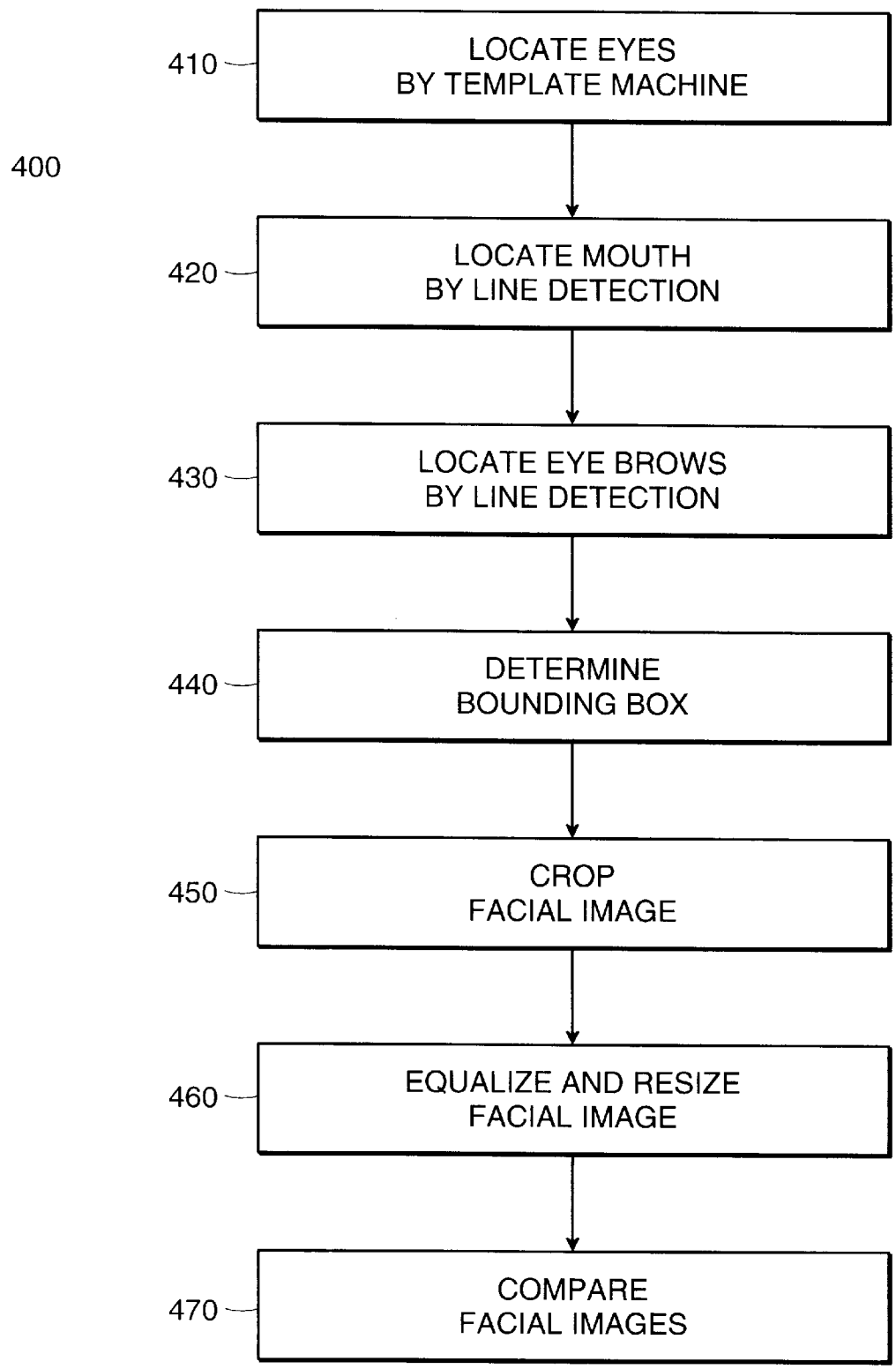
FIG. 4 is a flow diagram in accordance with the principles of the present invention.

FIG. 4 shows steps 400 for mapping, the facial images to the wireframe topology 200 of FIG. 2. Facial anthropometric data describing the approximate human facial proportions can be used to initiate the search for the eyes, mouth, and eyebrows. In step 410, the location of the eyes can be determined using any one of several techniques, such as template matching or an eigenfeature approach. In steps 420 and 430, the location of the mouth and eyebrows can also be determined with template matching, the eigenfeature approach, or line detection. The location of the eyes and mouth are used to compute a global affine transform, i.e., a global shift and scaling in both the x- and y- directions. This shift can be used to map the reference image 300 to the wireframe topology 200 to generate a "reference" wireframe topology.

Figure 5:
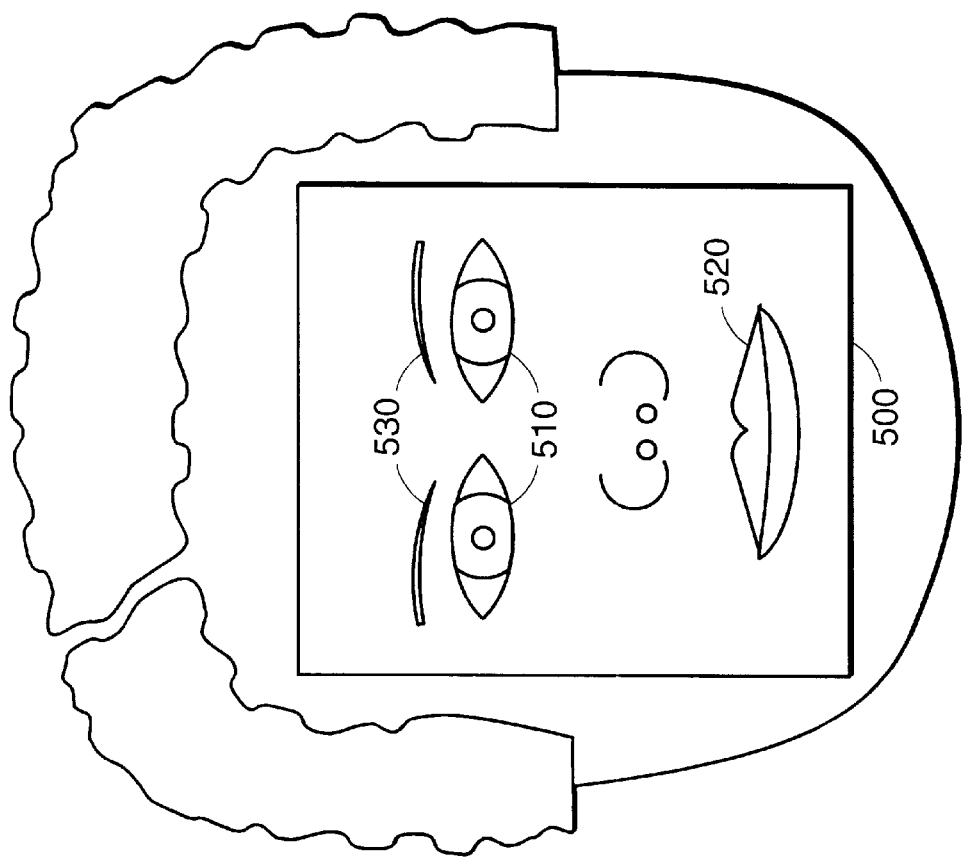
FIG. 5 is a diagram of a cropped face.

As shown in FIG. 5, after the eyes 510, mouth 520 and eyebrows 530 have been located in steps 410, 420, and 430, a bounding box 500 is determined in step 440 of FIG. 4. The bounding box 500 is used to "crop" the facial image in step 450. The cropping step is performed to remove complicating features such as the background, hair, and the chin, which can vary significantly in different faces.

The bounding box 500 is a smallest rectangular box which encloses the located facial features within a predetermined margin. In a preferred embodiment, the bounding box 500 extends twenty pixels from the outer corners of the eye brows, eyes, and mouth. Cropping makes face image registration, a following step, more robust.

The portion of the facial image left after cropping is image equalized in step 460 to enhance contrast. The equalized image is resized to a "standard" image size, for example, 200×200 pixels. The resizing allows the image registration step to operate on same-sized images.

Figure 6:
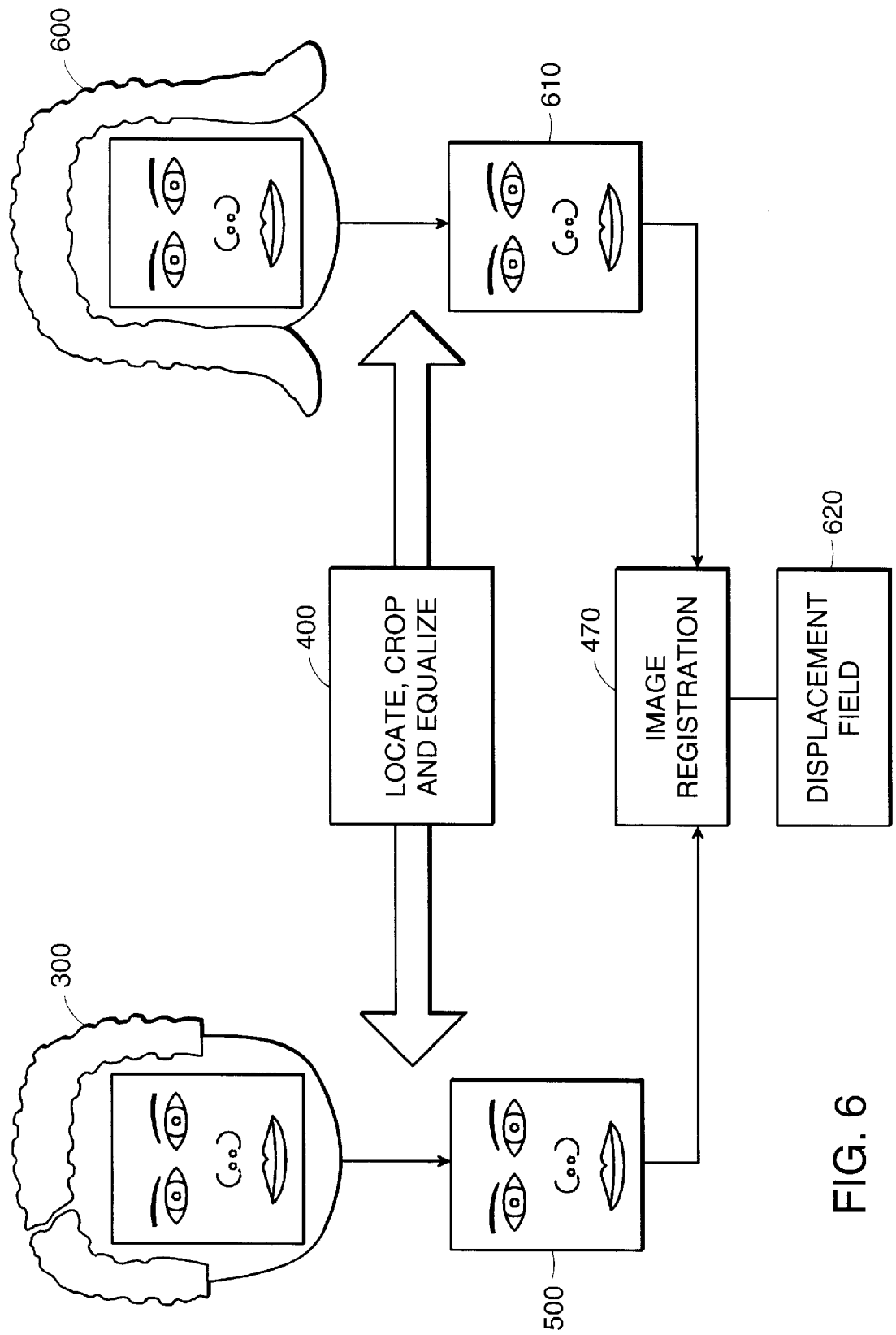
FIG. 6 is a flow diagram of matching images of two cropped faces.

As shown in FIG. 6, the steps 400 are performed for the composite reference facial image 300, and a target facial image 600 to be mapped to the wireframe topology 200. The equalized cropped images 500 and 610 are compared by an image registration step 470. Step 470 minimizes warped image intensity differences between the cropped reference and target images. As shown in FIG. 6, image registration produces a displacement field 620. The displacement field 620 can be used to relocate the nodes of the reference wireframe topology which was mapped to the composite reference facial image 300 so that the nodes are aligned with the salient facial features of the target facial image 600.

In the preferred embodiment of the invention, a spline-based image registration technique is used to determine the displacement field 620, please see U.S. Pat. No. 5,611,000, "Spline-Based Image Registration" issued to Szeliski on Mar. 11, 1997, incorporated by reference herein. For the two image case, spline-based image registration solves the general image registration problem of determining the displacement field 620 so as to minimize the intensity differences between the reference image 300 and the target image 600. This minimization problem will typically have many locally optimal solutions. However, the previous steps 410, 420, and 430 of matching facial features help reduce the likelihood of an erroneous registration.

Figure 7:
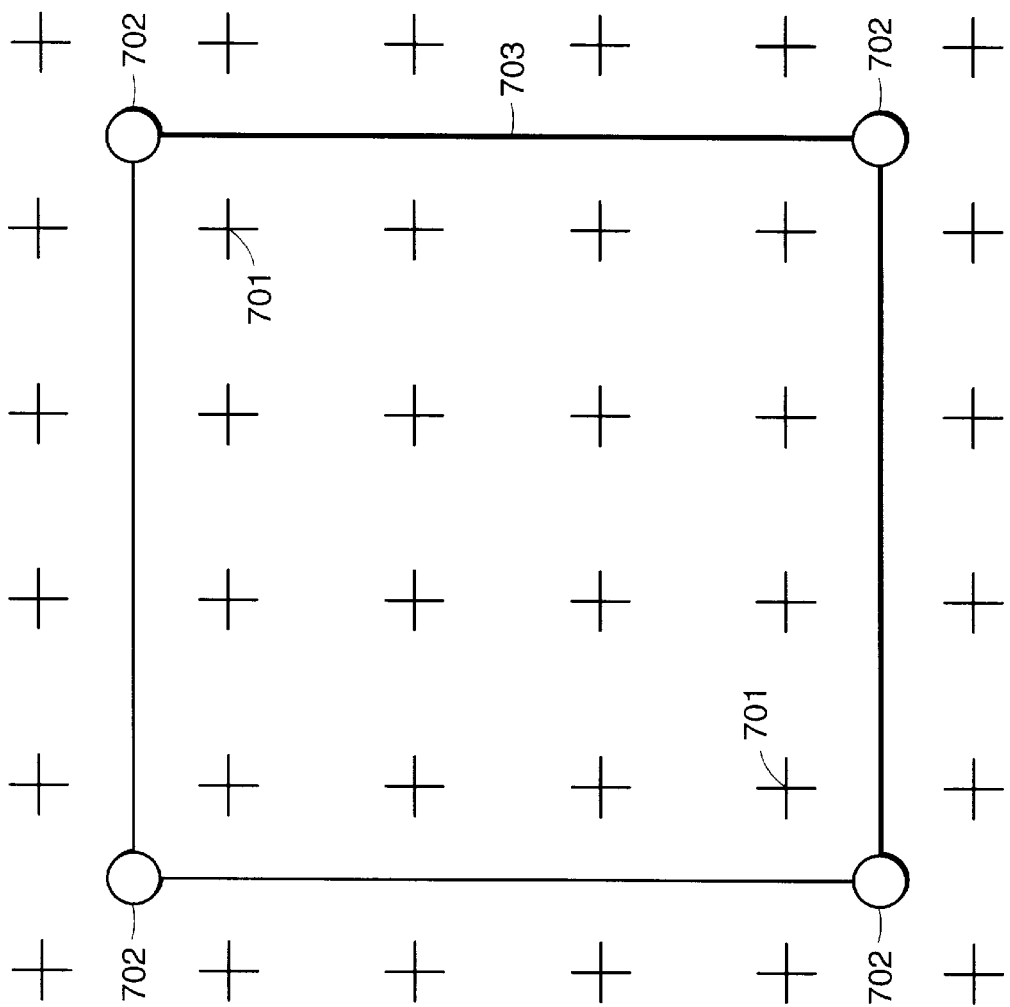
FIG. 7 is a diagram of spline control vertices superimposed on a pixel grid.

As shown in FIG. 7, pixel displacements $\{(U_i, V_i)\}$ are shown as pluses (+) 701, and spline control vertices $\{(U_j, V_j)\}$ are shown as circles (o) 702. Here, sixteen displacements fields u(x,y) and v(x,y) 701 are controlled by a smaller number (four) of coarse displacement estimates $U_j$, and $V_j$. The value for the displacement of a pixel i can be expressed as:

$$u(x_i, y_i) = \sum_j U_j B_j(x_i, y_i) \text{ also expressable as } u_i = \sum_j U_j w_{ij}$$

where the $B_j(x_i, y_i)$ are called the basis functions, and are only non-zero over a small interval, and $w_{ij}=B_j(x_i, y_i)$ are called the weights of the spline 703 to emphasize that the $(u_i, v_i)$ are known linear combinations of $(U_j, V_j)$. In the preferred implementation, the basis functions are spatially shifted versions of each other, i.e., $B_j(x_i, y_i)=B(x-X_j, y-Y_j)$. In addition, the form assumed by $B_j(x_i, y_i)$ is that of a simple interpolation function.

The Levenberg-Marquadt algorithm can be used to iteratively determine the displacement of the spline vertices (U, V). In order to handle large displacements, the algorithm can be run in a coarse-to-fine (hierarchical) manner.

Having described a preferred embodiment of the invention, it will not become apparent to one skilled in the art that other embodiments incorporating its concepts may be used. It is felt therefore, that this embodiment should not be limited to the disclosed embodiment, but rather should be limited only by the spirit and the scope of the appended claims.

What is claimed is:

1. A computerized method for mapping a digitized target image of a face to a wireframe topology stored in a memory in a computer system, where the image is composed of a plurality of pixels arranged in a regular pattern, and the wireframe topology is composed of a plurality of nodes connected by lines, comprising the steps of:

detecting a plurality of facial features contained in both the image and wireframe topology;

computing a bounding box from said plurality of detected facial features;

cropping a reference facial image using the bounding box, wherein the reference facial image is a composite image of a plurality of facial images;

cropping the digitized target facial image using the bounding box;

registering the cropped reference facial image with the cropped target facial image to determine a displacement field using a spline-based image registration; and applying the displacement field to a reference wireframe topology to map the target facial image to the wireframe topology.

2. The method of claim 1 wherein the reference facial image is a composite image of a plurality of facial images.

3. A computerized method for mapping a digitized target image of a face to a wireframe topology stored in a memory in a computer system, where the image is composed of a plurality of pixels arranged in a regular pattern, and the wireframe topology is composed of a plurality of nodes connected by lines, comprising the steps of:

detecting a plurality of facial features contained in both the image and wireframe topology by the steps of:

determining a plurality of facial landmark nodes in the wireframe topology corresponding to the detected facial features;

computing a transform between the facial features and the landmark nodes;

applying the transform to the wireframe topology to generate a reference wireframe topology for the reference facial image;

computing a bounding box from said plurality of detected facial features;

cropping a reference facial image using the bounding box:

cropping the digitized target facial image using the bounding box;

registering the cropped reference facial image with the cropped target facial image to determine a displacement field; and applying, the displacement field to a reference wireframe topology to map the target facial image to the wireframe topology.

4. The method of claim 3, wherein the transform is a global affine transform with shifting and scaling of the pixels in x- and y- directions.

5. The method of claim 1 wherein the displacement field is expressed as the displacement of spline control vertices between the cropped facial images.

6. A computerized method for mapping a digitized image of a face to a wireframe topology stored in a memory in a computer system, where the image is composed of a plurality of pixels arranged in a regular pattern, and the wireframe topology is composed of a plurality of nodes connected by lines, comprising the steps of:

detecting a plurality of facial features from the plurality of pixels of a reference facial image, where the reference facial image is a composite image of a plurality of facial images, and the target facial image is registered with the composite reference facial image;

determining a plurality of facial landmark nodes in the wireframe topology corresponding to the detected facial features;

computing a transform between the facial features and the landmark nodes;

applying the transform to the wireframe topology to generate a reference wireframe topology for the reference facial image;

cropping the reference facial image using a bounding box;

cropping a target facial image using the bounding box;

registering the cropped reference facial image with the cropped target facial image to determine a displacement field; and applying the displacement field to the reference wireframe topology to map the target facial image to the wireframe topology.

\* \* \* \* \*